Figures 3, 4:
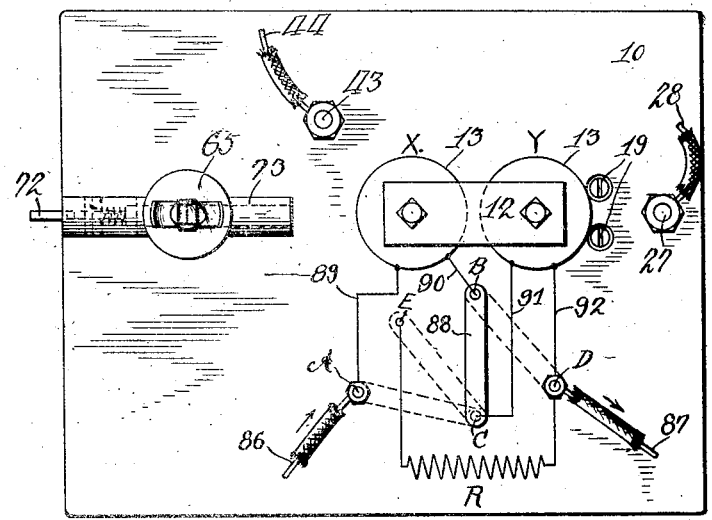

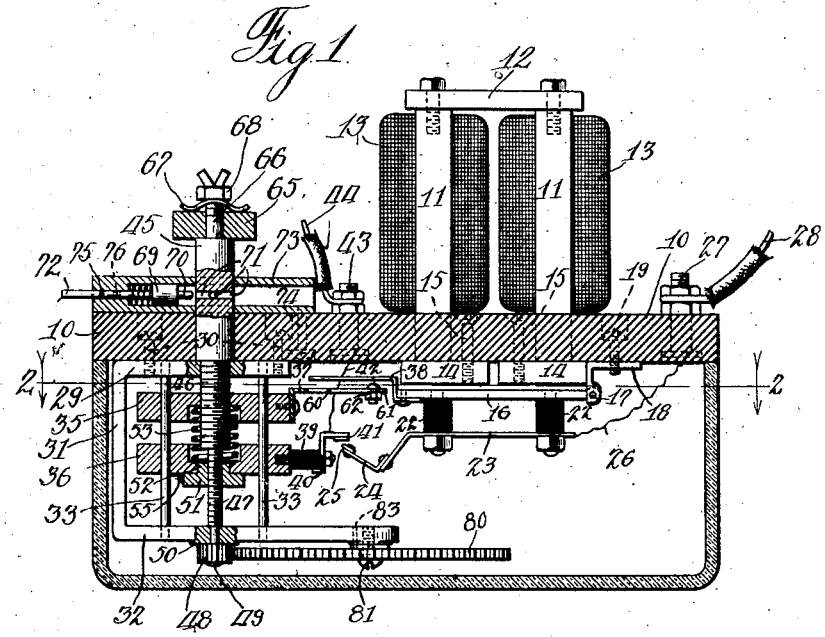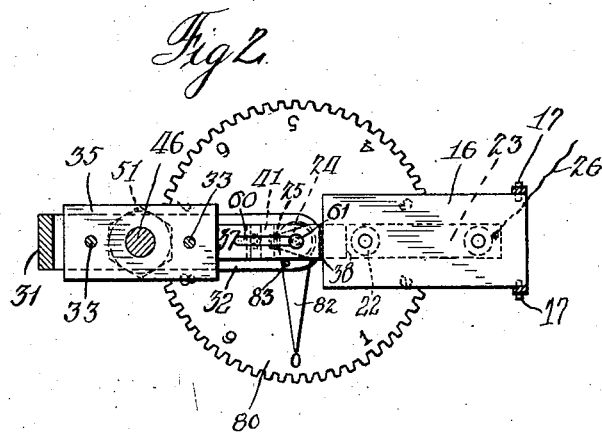

Feb. 15, 1927.
C. O. HARRINGTON
RELAY
Filed June 2, 1921

Patented Feb. 15, 1927.

1,617,594

UNITED STATES PATENT OFFICE.

CLINTON O. HARRINGTON, OF CHICAGO, ILLINOIS, ASSIGNOR TO ALDOBILT COMPANY, OF CHICAGO, ILLINOIS, A CORPORATION OF ILLINOIS.

RELAY.

Application filed June 2, 1921. Serial No. 474,542.

My invention relates to relays. One of its important objects is to provide a relay according to which, at pick-up current, a suitable pressure between the make-and-break contacts will be automatically provided throughout the normal and substantially large range of adjustment of the air-gap in the magnetic circuit. According to the specific device illustrated herein this contact pressure is substantially uniform at the several adjustments of the air gap, among the advantages of which is substantial uniformity in electrical resistance at the contacts.

Another important object is to provide means in association with a relay for indicating the amount of adjustment obtained, both of the air gap (in the specific device shown) and of the contact opening, whereby the use of special measuring instruments is avoided in making the desired adjustments, and whereby, upon determining the current for which the instrument is to be adusted, the adjustment of both the air gap and the contact opening may be made for that current in a simple and expeditious way according to indicator means associated with the device.

According to the illustrated specific embodiment of the present invention a single adjustment made according to a single reading of the indicator simultaneously adjusts the air gap and the contact opening in their proper relation to each other.

It has heretofore been suggested to employ in a relay means for adjustably varying an air gap in the magnetic circuit, together with independent means for adjusting the distance between the contacts. According to such a relay of the prior art the adjuster of the instrument, by careful and painstaking work in the nature of tests and experimentations, could secure appropriate adjustments of both the air gap and of the contacts throughout the adjustment range, but such an adjustment would be exceedingly difficult and substantially impracticable in the field at the time and place the adjustment is desired. In practice the instrument of the older kind referred to would first be adjusted prior to installation for use in connection with a predetermined current, and, later, should a further adjustment be required, the device would be removed from service and taken back to the shop.

According to the present improvements the desired adjustments may be made in a very brief space of time, without removing the relay from service, and without the use of auxiliary measuring means.

A further object is to provide a relay having means for readily varying in predetermined amounts the magnetizing force of the magnet coils which is produced by a given current available for operating the relay. According to this feature if the current available at a particular place be either too large or too small for operating the relay within the limits of adjustment of the air gap and at a given arrangement of the current flow, the flow of the current to the magnet coil or coils may be so varied as to produce a lesser or greater magnetizing force, and thereby bring the available current within the limits of adjustment of the air gap.

Other objects and advantages will appear hereinafter.

In the accompanying drawings, which form a part of this specification, Figure 1 is a vertical section through the magnet cores and other parts of my improved relay as it is normally positioned for use; Fig. 2 is a horizontal section on the line 2—2 of Fig. 1; Fig. 3 is a top plan of the device; and Fig. 4 is an enlarged face view of a form of chart which may accompany the device and which shows the operating current at various adjustments of the instrument.

The base 10 of my improved relay is shown as a rectangular piece of insulating material such as porcelain. The magnet cores 11, the back strap 12 and the magnet windings 13 are to be understood as being according to well-known construction. The cores 11 terminate in pole pieces 14 which are shown as integral with the cores respectively, are circular in face view, and each of which is eccentric to its core axis whereby the centers of the pole pieces respectively are brought closer to each other, enabling the use of a shorter armature and reducing its weight and magnetic reluctance. The pole pieces and the cores are held on the base in their desired positions by screws 15.

The armature 16 is shown as a rectangular piece of flat iron hinged at 17 to the bracket 18 secured by screws 19 to the base 10. The armature carries a pair of threaded insulating studs 22 and these in turn support the contact member 23 consisting of a piece of sheet metal bent as indicated in Fig. 1 and to which is secured a thinner and more resilient member 24 having secured to it the contact tip 25. The contact member 23 is electrically connected by flexible wire 26 to the binding post 27 to which is secured the lead 28 for the current controlled by the relay.

The construction thus far described, while differing in minor respects from hitherto suggestions, is, as to function and result, in accordance with practice well known.

Upon the under side of the base 10 is secured a metallic U-shaped bracket having a part 29 secured by screws 30 upon the base 10, a normally downwardly-extending part 31, and a horizontal part 32. Between and rigidly secured to the bracket parts 29 and 32 are two guiding-and-supporting rods 33 spaced apart and parallel to each other. Two rectangular metallic blocks or carriers 35 and 36 are bored so as to fit slidingly upon the rods 33 as well illustrated in Fig. 1. The block 35 carries a support 37 which extends below the light-weight metallic extensions 38 of the armature 16 and acts as a rest or stop which limits the gravitational movement of the armature away from the pole faces of the cores. The other movable block or carrier 36 carries a threaded insulating stud 39 upon which is positively held the small metallic bracket 40 carrying the contact plate 41 close to and above the contact tip 25. The contact 41 is electrically connected by a flexible wire 42 to the binding post 43 to which is secured the lead 44 for the current controlled by the relay. It is thus clear that between the binding posts 27 and 43 there is a make-and-break device including a contact controlled by the movement of the armature.

It is well understood in the art that by increasing or decreasing an air gap in the magnetic circuit the reluctance of the circuit is increased or decreased. According to these improvements as specifically illustrated I provide means for adjustably varying the air gap between the armature 16 and the pole pieces 14 for varying this reluctance, thus increasing or decreasing the responsiveness of the armature to the magnetic energy whereby the armature will move toward the pole face in response to different values of the current passing through the magnet coils.

In the specific device illustrated the air gap and the distance between the contacts are both varied adjustably by means for moving the carriers 35 and 36. For this purpose I provide a unitary shaft 45 which passes loosely through the base 10 and is journaled in the metallic bracket member 29 at a reduced diameter of the shaft 45, thus providing a shoulder which prevents longitudinal movement of the shaft in one direction. The reduced portion 46 of the shaft 45 is threaded and the carrier 35 is interfittingly threaded whereby rotation of the shaft 45 will move the carrier 35 upon the guides 33. The shaft 45 has a further reduced portion 47, this latter portion being journaled in the bracket member 32 and carrying the pinion 48, the shaft being riveted at 49 upon the pinion, the inner face of the pinion bearing against the surfaced boss 50 on the bracket member 32, the shaft 45 thus being maintained against longitudinal movement in the other direction from that above mentioned. This reduced portion 47 of the shaft is also threaded, with threads of the same direction as those on the part 46, and when the shaft 45 is rotated the carrier or block 36 is moved thereby through the action of a nut member 51 threaded upon the shaft portion 47 and held rigidly upon the carrier 36 when the device is in use. This nut member 51 comprises a hexagonal head, indicated by dotted lines in Fig. 2, and a cylindrical stem 52 rotatably journaled for preliminary adjustment purposes in the block 36 and having its inner edge spun over so as to overlie a portion of the block 36 whereby the nut member 51, 52 is permanently though rotatably retained in its operative position. In order that the relay may operate according to the chart provided as a guide to its future adjustments the air gap and the distance between the contacts must be independently adjusted so that with a given air gap the pick-up and release current values will correspond to the chart for that air gap. After this initial calibration has been made the nut member 51 is secured, as by soldering at 55, to the block 36.

Each block 35 and 36 is provided with a recess facing the other and containing a coiled expansion spring 53 adapted to maintain the blocks against lost motion or play with respect to each other.

It is here pointed out that the threads upon the part 46 of the shaft 45 are of greater pitch than those on the part 47 of this shaft. In my practice the shaft part 46 has thirty-six threads per inch and the shaft part 47 has forty-eight threads per inch, but the ratio of the respective thread pitches may vary according to the construction or arrangement of other features of the device, as will hereinafter more fully appear.

It is clear that when the screw shaft 45 is rotated both the carriers 35 and 36 will move in a common direction, and that when the air gap is increased or decreased the distance between the contacts is also increased or decreased, but in an amount which is less than would be the case if the contact as 41 were fixed.

Since the desired relative movement between the carriers 35 and 36 (determined by the difference in pitch of the threads on the screw shaft 45) will depend partly upon the distance from the armature pivot 17 to the point where the armature is supported in comparison with the distance from the same pivot to the contact 25, (having consideration of the difference in arcuate movement due to different radial lengths) I have provided means for adjusting this latter ratio whereby the desired results of a substantially uniform pressure between the contacts at the various air gap adjustments may be secured without exclusive reliance upon the ratio of the thread pitches on the screw shaft 45. That is to say, the device may be constructed with the ratio of thread pitches hereinabove mentioned, (namely 36 to 48) or with a different ratio, and, though the instrument may be constructed with a somewhat different arrangement or proportion of parts the desired result may be obtained by adjusting the ratio between the effective radius of the armature and that of the contact member carried by it. In the specific device illustrated the rest or stop member 37 is longitudinally slotted at 60 and a small round-headed bolt 61 constituting the stop proper and held adjustably in place by a nut 62 is movable through the slot 60 whereby the radial distance from the pivot 17 to the button 61 may be increased or decreased, thus varying the ratio between this radius and that of the contact 25. With this provision of adjustment it is merely a matter of ordinary calibration to determine the relative position of the stop button 61.

According to these improvements the contact pressure may be maintained substantially uniform throughout a wide range of adjustment of the air gap, and by the term "substantially uniform" in this connection I do not mean to exclude relatively small variations in pressure in both directions from a given mean, such slight variations being substantially inherent in any construction of this character due to variations in materials and workmanship, but which variations in a device embodying the present invention are unimportant to the desired result.

Means for turning the screw shaft 45 comprise a hand wheel 65 frictionally held upon the reduced stem 66 by the spring 67 and nut 68. This friction drive is provided to prevent damage to the threads at 46 and 47 or to other parts through careless manipulation. Means for holding the screw shaft 45 in a desired position of adjustment include a spring-pressed plunger 69 having a forwardly projecting pin 70 adapted to enter any one of four radial equidistant holes 71 in the shaft 45, the pin 70 being retractible by means of its outwardly projecting end 72, the plunger being carried within a casing 73 secured upon the base 10 as by a screw 74 and the holding effect of the shaft 45. When the pin 70 is in locking position the hole 75 in the rod 72 registers with the hole 76 through the casing member 73 whereby a wire may be passed through these parts and sealed for maintaining the adjustment made.

I also provide means for indicating the relative adjustments secured by turning the screw shaft 45, these means comprising the pinion 48 driven by the shaft 45 and meshing with the gear 80 journaled on the bracket arm 32 by a shouldered screw 81. The pointer 82 is held also upon the screw 81 and is maintained against rotation by a locking pin 83.

The gear 80 is marked as a dial and its movement relative to the fixed pointer 82 indicates the adjustment of the several parts simultaneously made, and, consequently the pick-up and release values of the current passing through the magnet coils.

In Fig. 3 I have shown, partly in diagrammatic form, a device mounted on the base 10 for adjustably varying, in predetermined amounts, the magnetizing force of the magnet produced by a given current supply. To this end I provide a pair of binding posts A and D to which the lead wires 86 and 87 carrying the current for energizing the magnet are connected respectively. I also provide binding posts C, E and B so located that a common metallic conductor 88 may be connected between the binding posts A and C and between the posts C and E and between the posts C and B and also between the posts B and D, as well indicated by full and dotted lines in Fig. 3. The distances between A and E, between E and B and between C and D are preferably such that the connector 88 may not be erroneously positioned between them.

The arrangement of the connector 88 between B and C as shown in Fig. 1 places the two magnet coils X and Y in series. Thus, assuming that the current enters at A, it passes through the lead 89 to the coil X and passes thence through the lead 90 to the binding post B, thence through the connector 88 to the binding post C and thence through the lead 91 to the magnet coil Y, and after traversing that coil it passes through the lead 92 to the binding post D. This arrangement is shown in column 2 of the chart device illustrated in Fig. 4, and the other desirable arrangements are indicated in columns 3, 4 and 5 of the chart.

If it should be desired to energize coil Y alone, in which case the pick-up current would have to be doubled owing to the energization of only half the number of magnet turns (assuming the coils X and Y to be the same in all material respects), connector 88 is placed between the binding post A and C, as shown in column 3 of the chart, in which case the current would pass from A to C and from there through lead 91 to magnet Y and through lead 92 to binding post D.

It is sometimes desirable to connect the magnet coils in multiple, thereby decreasing the resistance through these coils, and to accomplish this two connectors as 88 are employed and arranged as indicated in column 4 of the chart, in which case the current from lead 86 divides at A and passes in equal amounts first through lead 89 to coil X, thence back through lead 90 to binding post B and thence through the connector 88 to binding post D, the other half of the current passing from A to C, thence through lead 91 to coil Y and thence back through lead 92 to binding post D.

Where it is desired still further to increase the pick-up current a portion of the current may be shunted through a resistor R connected to binding posts E and D. Column 5 of the chart shows the arrangement of the connectors for this purpose, in which case the current passes from A to C and there divides, one part passing from C to E and from E through the resistor R and passes out at the binding post D, the other part passing through lead 91, through the coil Y and back through lead 92 to the binding post D.

The principal advantages of the current-controlling device just described arise from the fact that it is self-contained with the rest of the device, the leads 86 and 87 are always secured to the same binding posts A and D respectively, the various connections can readily be made and with the certainty of making the proper connections for a given result, and the resistor R, being a fixed part of the device, is always a predetermined and known quantity in the result. Furthermore, the various adjustments for current control may be made by a relatively inexperienced person by referring to the diagram or chart such as shown in Fig. 4.

In the chart of Fig. 4 "P—U" means pick-up and "Rel." means release. The relative current values shown in column 2 and in column 5 are to be understood as being merely suggestive and as indicating the wide range of adjustment desirable and obtainable in a relay of the kind described. The actual figures insertable throughout the chart will depend upon the calibration of the instrument, and the particular resistance of the magnet coils and of the resistor R employed.

When it is desired to use one of these relays in service it is only necessary first to determine the current available, which we may assume for instance to be .480 ampere. By reference to the chart in one of the columns marked P—U either this exact strength of current or one closely approximating it will be found opposite a certain dial reading shown in column 1. We may assume that this current value will be found in column 3 of the chart opposite dial reading 3. Thereupon the operator adjusts his coil connections in accordance with the diagram at the top of column 3, and then simply turns the hand wheel 65 until the finder 82, Fig. 2, points to 3 on the dial 80. If the operator should find that his available current is one which lies between two pick-up values as shown by the chart he can by an ordinary method of interpolation determine the precise setting for the dial.

According to these improvements, therefore the relay may be adjusted in an exceedingly brief space of time, without removing it from service, without the use of an auxiliary instrument, and by one who is not especially skilled in the adjustment of devices of this general kind.

While I have thus illustrated and described a highly efficient and desirable embodiment of these improvements I contemplate as being within the present invention various modifications of the specific structure herein disclosed as indicated in the appended claims.

I claim:

1. In a relay, the combination of an electromagnet, an armature mounted to move in response to the magnetic energy, means including a pair of contacts, one of which is controlled by the movement of the armature, for making and breaking an electric circuit, and unitary means for adjustably increasing and decreasing the responsiveness of the armature to the magnetic energy and for maintaining substantially a uniform pressure between said contacts at the several adjustments of such responsiveness and when the magnet is energized at the pick-up current.

2. In a relay, the combination of an electromagnet, an armature mounted to move in response to the magnetic energy, means including a pair of contacts, one of which is controlled by the movement of the armature, for making and breaking an electric circuit, the magnetic circuit having an air gap to provide reluctance to the magnetic flux, unitary means for adjustably increasing and decreasing the air gap and for maintaining substantially a uniform pressure between said contacts at the various adjustments of the air gap and when the magnet is energized at pick-up current, and means for indicating the relative magnitudes of such increase and decrease of the air gap.

3. In a relay, the combination of an electromagnet, an armature mounted to move in response to the magnetic energy, means including a pair of contacts, one of which is controlled by the movement of the armature, for making and breaking an electric circuit, unitary means for moving the armature for adjustably increasing and decreasing the responsiveness of the armature to the magnetic energy whereby the armature will be actuated to close the circuit through said contacts by different values of the current passing through the magnet and for simultaneously increasing or decreasing adjustably the distance between said contacts, the rate of adjustment of the distance between the contacts being such that a substantially uniform pressure between the contacts will be maintained throughout the range of adjustment when the magnet is energized at pick-up current.

4. In a relay, the combination of an electromagnet, an armature mounted to move in response to the magnetic energy, means including a pair of contacts, one of which is controlled by the movement of the armature, for making and breaking an electric circuit, and means for simultaneously moving adjustably both contacts and at different rates.

5. In a relay, the combination of an electromagnet, an armature mounted to move in response to the magnetic energy, means including a pair of contacts, one of which is controlled by the movement of the armature, for making and breaking an electric circuit, and means for simultaneously moving adjustably both contacts and the armature, the rate of movement of the contact which is not under the control of the armature being different from the rate of movement of the other contact.

6. In a relay, the combination of an electromagnet, an armature mounted to move in response to the magnetic energy, means including a pair of contacts, one of which is controlled by the movement of the armature, for making and breaking an electric circuit, and means for simultaneously moving adjustably the armature, the contact controlled thereby, and the other contact, the rate of movement of the armature and the contact controlled thereby being different from the rate of movement of the other contact and means for indicating pre-calibrated amounts of said adjustment movements.

7. In a relay, the combination of an electromagnet, an armature mounted to move in response to the magnetic energy, means including a pair of contacts, one of which is controlled by the movement of the armature, for making and breaking an electric circuit, and means including a threaded member having threads thereon of different pitches respectively for simultaneously moving adjustably the armature, and with it the contact controlled thereby, at a predetermined rate and the other contact at a different predetermined rate.

8. In a relay, the combination of an electromagnet, an armature mounted to move in response to the magnetic energy, means including a pair of contacts, one of which is controlled by the movement of the armature, for making and breaking an electric circuit, means for simultaneously moving adjustably both contacts and at different rates, and means for indicating the relative adjustment at any time made.

9. In a relay, the combination of an electromagnet, an armature mounted to move in response to the magnetic energy, means including a pair of contacts, one of which is controlled by the movement of the armature, for making and breaking an electric circuit, means for simultaneously moving adjustably both contacts and the armature and at different rates, and means for indicating the relative adjustment at any time made.

10. In a relay, the combination of an electromagnet, an armature mounted to move in response to the magnetic energy, means including a pair of contacts, one of which is controlled by the movement of the armature, for making and breaking an electric circuit, means for simultaneously moving adjustably the armature, the contact controlled thereby and the other contact, the rate of such adjustment movement of the armature and of one of said contacts being the same and being different from that of the other contact and means for indicating the relative adjustment at any time made.

11. In a relay, the combination of an electromagnet, an armature mounted to move in response to the magnetic energy, means including a pair of contacts, one of which is controlled by the movement of the armature, for making and breaking an electric circuit, means including a threaded member having threads thereon of different pitches respectively for simultaneously moving adjustably the armature, and with it the contact controlled thereby, at a predetermined rate and the other contact at a different predetermined rate and means operatively associated with said threaded member for indicating the relative adjustment at any time made.

12. In a relay, the combination of an electromagnet, an armature mounted to move in response to the magnetic energy, means including a pair of cooperating contacts, one of which is controlled by the movement of the armature, for making and breaking an electric circuit, and unitary means for simultaneously moving adjustably both contacts and at different rates.

13. In a relay, the combination of an electromagnet, an armature mounted to move in response to the magnetic energy, means including a pair of cooperating contacts, one of which is controlled by the movement of the armature, for making and breaking an electric circuit, and unitary means for simultaneously moving adjustably both contacts and the armature, the rate of movement of one of said contacts being different from that of the armature.

CLINTON O. HARRINGTON.